(12) United States Patent  
Miyashita et al.

(10) Patent No.: US 8,220,975 B2  
(45) Date of Patent: Jul. 17, 2012

(54) LENS MEMBER AND OPTICAL UNIT USING SAID LENS MEMBER

(75) Inventors: Junji Miyashita, Fujiyoshida (JP); Yasuaki Kayanuma, Fujiyoshida (JP); Makoto Yasuhara, Yamanashi (JP)

(73) Assignees: Citizen Electronics Co., Ltd., Yamanashi (JP); Citizen Holdings Co., Ltd., Tokyo (JP)

( * ) Notice: Subject to any disclaimer, the term of this patent is extended or adjusted under 35 U.S.C. 154(b) by 319 days.

(21) Appl. No.: 12/776,730

(22) Filed: May 10, 2010

(65) Prior Publication Data  
US 2010/0284194 A1 Nov. 11, 2010

(30) Foreign Application Priority Data

May 9, 2009 (JP) .............................. P-2009-114065  
Jan. 7, 2010 (JP) .............................. P-2010-002291

(51) Int. Cl.  
*F21V 5/02* (2006.01)

(52) U.S. Cl. ... 362/340; 359/642; 362/327; 362/311.02; 362/311.09

(58) Field of Classification Search .................. 359/642; 362/311.02, 311.09, 326, 327, 332, 335, 362/337, 340  
See application file for complete search history.

(56) References Cited

U.S. PATENT DOCUMENTS 6,924,943 B2 * 8/2005 Minano et al. ................ 359/720  
7,813,055 B2 * 10/2010 Yasumoto et al. ............ 359/742

FOREIGN PATENT DOCUMENTS

| JP | 57-55002 A | 4/1982 |
| JP | 59-119340 A | 7/1984 |
| JP | 05-281402 A | 10/1993 |

* cited by examiner

*Primary Examiner* — Stephen F Husar  
(74) *Attorney, Agent, or Firm* — Browdy and Neimark, PLLC

(57) ABSTRACT

A plate-shaped lens member has concentric annular prisms each including an inner annular surface divided from a light-entrance surface of a conventional TIR lens and an outer annular surface divided from a light-reflection surface of the TIR lens in which the light-entrance surface has a concave shape provided in a lower portion of the TIR lens and the light-reflection surface has a convex shape positioned at a peripheral side of the TIR lens to surround the light-entrance surface. The light-entrance surface and light-reflection surface of the bulky TIR lens are Fresnel-ized or divided into a set of concentric annular prisms on a surface of the plate-shaped lens member and positions of divided portions from the TIR lens are efficiently arranged on the surface of the plate-shaped lens member.

17 Claims, 20 Drawing Sheets

LENS MEMBER AND OPTICAL UNIT USING SAID LENS MEMBER

CROSS-REFERENCE TO THE RELATED APPLICATION

The application is based on and claims the priority benefit of Japanese Patent Applications No. 2009-114065, filed on May 5, 2009 and No. 2010-002291, filed on Jan. 7, 2010, the entire descriptions of which are incorporated herein by reference.

BACKGROUND OF THE INVENTION

1. Field of the Invention

The present invention relates to a lens member and an optical unit using said lens member, used in, for example, LED lighting, and the like.

2. Related Art Statement

LED optical products such as lighting, projectors, flash, headlights and tail lamps of automobiles and the like, in which an LED is utilized as a light source, or basic optical devices such as a narrow directivity LED, and so on, generally use a lens for focusing or collimating the light emitted from the LED. Although a convex refractive lens is usually employed for this kind of lens, adoption of a Fresnel lens with the aim of height reduction and thinning is also proposed.

Conventionally, there is proposed a lens for a lamp fitting which has a lattice-shaped refracting system prism formed in a central portion of the inner surface near the optical axis, and also has a lattice-shaped reflecting system prism formed in a peripheral portion of this lattice-shaped refracting system prism (refer, for example, to JP 57-55002 A). In addition, there is proposed a Fresnel lens in which a part of the prisms of the Fresnel lens surface acting as a light-entrance surface is formed such that a part of the entering light rays are emitted from the light-exit surface after being totally internally reflected at the non-lens surface (refer, for example, to JP 59-119340 A). Furthermore, there is proposed an optical device configured from a refractive lens portion having a lens body provided at a central portion of the optical axis and a reflecting body portion, the reflecting body portion allowing light rays to enter from an inner surface portion and totally internally reflecting the light rays at a paraboloid-shaped reflecting surface, thereby converting the light rays into a parallel beam (refer, for example, to JP 05-281402 A).

However, the above-mentioned conventional technology leaves the following problems. That is, the lenses disclosed in JP 57-55002 A, JP 59-119340 A, and JP 05-281402 A have the disadvantage that a loss is generated due to a part of the entering light not reaching the reflecting surface, making it difficult to maximize usage efficiency of the light. For example, in JP 05-281402 A, there is a portion between the light-entrance surface and the refractive lens portion where the entering light does not reach the reflecting surface, resulting in loss of the light passing through this portion.

In addition, when an LED is used as the light source, the radiated light has a light distribution in which the greater the emission angle the smaller the light intensity; therefore, as shown in FIG. 29, when a conventional TIR (Total Internal Reflection) lens 1 is used, the light entering from the light-entrance surface of the concave lens portion 3 of the TIR lens 1 disposed to face the light source 2 is totally internally reflected at the reflecting surface of the outer convex lens portion 4; however, this results in the light L2 of relatively strong light intensity in the central portion vicinity being reflected at the reflecting surface at the outer peripheral area of the convex lens portion 4.

Consequently, in this TIR lens 1, brightness in the central vicinity is high, but becomes low in the intermediate vicinity and rises again at the outside. As a result, even if this TIR lens 1 is turned into a Fresnel lens, if a conventional method is used to do so, ring-shaped flare centered on the optical axis is generated which spoils the appearance.

Furthermore, in the lens disclosed in JP 05-281402 A, the light-entrance surface and light-exit surface of the reflecting lens portion are both formed as non-spherical surfaces, and there is therefore a problem that both processing is difficult and costs rise.

In addition, cases such as this lens, where a convex refractive lens portion is formed in the center, or where the central vicinity is a flat-shaped light-entrance surface, have the disadvantage that color variability of the light source can be seen on the light radiating surface.

SUMMARY OF THE INVENTION

An object of the present invention is to provide a plate-shaped lens member that is thinner, compared to a conventional bulky TIR lens, another object is to provide a lens member with high light use efficiency, and further objects are to provide an optical unit which dramatically increase the usage efficiency of entering light.

A plate-shaped lens member has concentric annular prisms each including an inner annular surface divided from a light-entrance surface of a TIR lens and an outer annular surface divided from a light-reflection surface of the TIR lens in which the light-entrance surface has a concave shape provided in a lower portion of the TIR lens and the light-reflection surface has a convex shape positioned at a peripheral side of the TIR lens to surround the light-entrance surface. The light-entrance surface and light-reflection surface of the bulky TIR lens are Fresnel-ized or divided into a set of concentric annular prisms on a surface of the plate-shaped lens member and positions of divided portions from the TIR lens are efficiently arranged on the surface of the plate-shaped lens member.

This plate-shaped lens member includes a light source-facing surface having a concave shape and disposed to face a light source, and a light-exit surface opposite to the light source-facing surface. Moreover, the concentric annular prisms are formed on the light source-facing surface, and the concentric annular prisms each include the inner annular surface and the outer annular surface that is positioned outside of the inner annular surface to form each of the prisms, wherein in divided portions from the light-reflection surface of the TIR lens, the divided portions positioned away from a central axis of the TIR lens are allocated to the outer annular surfaces of the concentric annular prisms that are positioned adjacent to a central axis of the plate-shaped lens member. The central axis of the plate-shaped lens member corresponds to a central axis of the light source-facing surface, and the light source-facing surface have a Fresnel lens surface fresnel-ized from the TIR lens, and the Fresnel lens surface include the concentric annular prisms centered on the central axis.

In each of the concentric annular prisms, the inner annular surface is positioned closer to the central axis than the outer annular surface, and the outer annular surface is a total-internal-reflection surface that totally internally reflects on the outer annular surface light received through the inner annular surface.

Consequently, comparatively strong light exited from a light reflection surface at positions laterally away from an optical axis of the light source in a conventional bulky TIR lens can be exited from area adjacent to the central axis of the light source or the central axis of the plate-shaped lens member. As a result, exited light appears to have the highest intensity of light at center of the lens with gradually lowering from the center toward the periphery of the lens, and the plate-shaped lens prevents a ring-shaped lens flare or outstanding ring-shaped dark or bright area from appearing.

Moreover, since light from the light source entering from the inner annular surface of each of the concentric annular prisms is totally internally reflected from the corresponding outer annular surface of each of the prisms, usage efficiency of light can be dramatically improved.

In a lens member in accordance with another embodiment of the present invention, the light source-facing surface includes a protruding portion on the central axis of the light source-facing surface in a conic shape toward a light source disposed to face the light source-facing surface. Moreover, an apex of the protruding portion lies on the central axis of the light source-facing surface, and the concentric annular prisms continuously formed from a position close to the apex of the protruding portion toward a peripheral area of the light source-facing surface.

An optical unit of the present invention comprises the above-described lens member of the present invention and a light source including at least one light-emitting diode element, the optical axis of the light source being disposed coaxially with the central axis of the light source-facing surface.

Since the optical unit of the present invention has the optical axis of the light source disposed coaxially with the central axis of the light source-facing surface, the usage efficiency of light emitted from the light source is high. The optical unit of the present invention thus makes it possible to achieve LED optical products, such as lighting, projectors, flash, headlights and tail lamps of automobiles and the like, that have an excellent appearance.

DETAILED DESCRIPTION OF THE PREFERRED EMBODIMENTS

Embodiments of the present invention are now described in detail with reference to the accompanying drawings.

Figure 1:
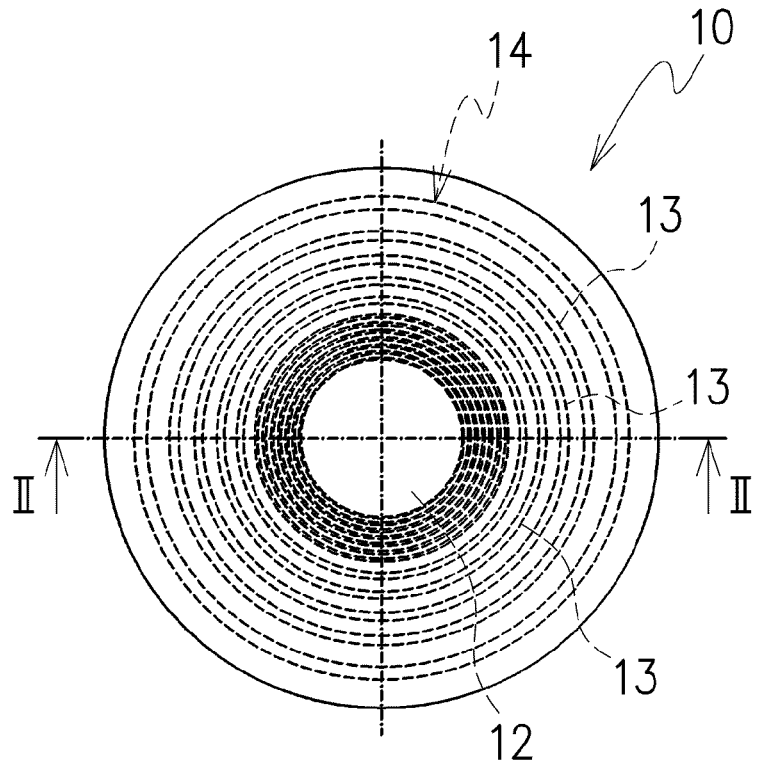
FIG. 1 is a plan view of a lens member in accordance with a first embodiment of the present invention, viewed from a light-exit surface of the lens member.
Figure 2:
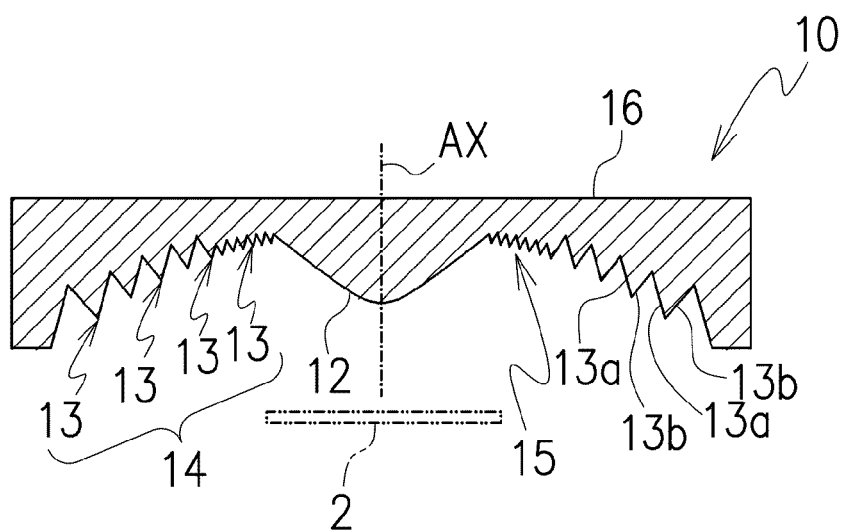
FIG. 2 is a cross-sectional view taken along the line II-II of the lens member shown in FIG. 1.
Figure 3:
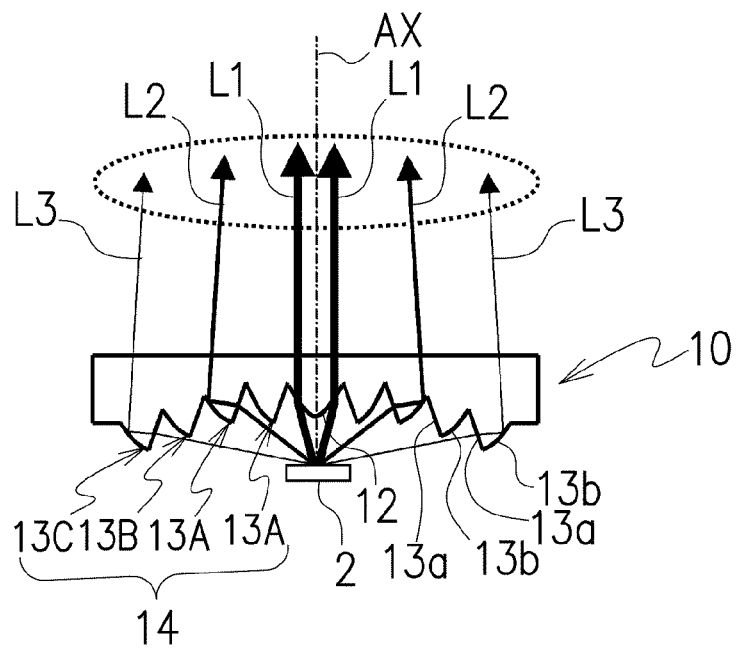
FIG. 3 is an explanatory diagram showing a principle of the lens member according to the present invention.

FIGS. 1-3 show a lens member 10 in accordance with a first embodiment of the present invention. Note that the scale in the various drawings used for the following description is suitably altered to render the various members of a discernible size.

Figure 29:
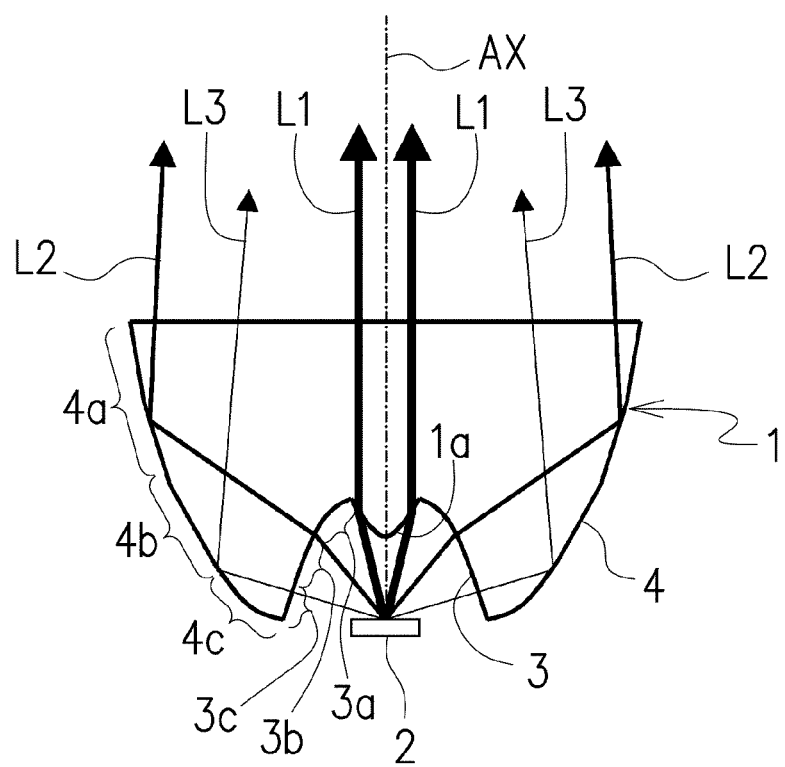
FIG. 29 is an explanatory diagram showing a principle of a conventional TIR lens.

A plate-shaped lens member 10 has a plurality of concentric annular prisms each including an inner annular surface divided from a light-entrance surface 3 of a conventional TIR lens 1 shown in FIG. 29 and an outer annular surface divided from a light-reflection surface 4 of the conventional TIR lens 1 in which the light-entrance surface 3 has a concave shape provided in a lower portion of the conventional TIR lens 1 and the light-reflection surface has a convex shape positioned at a peripheral side of the conventional TIR lens 1 to surround the light-entrance surface. The light-entrance surface being disposed to face a light source 2 that uses an LED with a central axis of the light-entrance surface and a central axis of the light source corresponded with each other, the concentric annular prisms are formed centering the central axis on the light source-facing surface, and the concentric annular prisms each include the inner annular surface 13a and the outer annular surface 13b that is positioned outside of the inner annular surface to form each of the prisms, wherein in divided portions 4a-4c from the light-reflection surface 4 of the conventional TIR lens 1, the divided portions positioned away from a central axis AX of the TIR lens 1, here 4a are allocated to the outer annular surfaces of the concentric annular prisms that are positioned adjacent to a central axis AX of the plate-shaped lens member, here 13A, for example. The central axis AX of the plate-shaped lens member corresponds to a central axis AX of the light source-facing surface, and the light source-facing surface have a Fresnel lens surface fresnel-ized from the conventional TIR lens 1, and the Fresnel lens surface include the concentric annular prisms formed around the central axis.

In each of the concentric annular prisms, the inner annular surface 13a is positioned closer to the central axis AX than the outer annular surface 13b, and the outer annular surface 13b is a total-internal-reflection surface that totally internally reflects on the outer annular surface 13b light received through the inner annular surface 13a.

The light source-facing surface 15 is formed overall in a concave shape, such that a central axis of the light source-facing surface 15 is positioned coaxially with the optical axis AX of the light source 2 disposed to face the light source-facing surface 15. The light source-facing surface 15 includes a plurality of concentric annular prisms 13 and 13A-13C centered on the central axis, the plurality of concentric annular prisms 13 having angles of refraction that differ from each other. Note that the lens member 10 is integrally formed from a light-transmitting material such as an acrylic resin. In addition, the light source 2 in the first embodiment may be a light source having a plurality of LED elements arranged therein, and also may be a light source having a plurality of LED elements that are disposed in a grid pattern. In this case of the light source including LED elements, a center of a light-emitting surface of the light source is considered to be the optical axis of the light source. Of course, a light source including a single LED element may also be used as the light source 2, in place of the LED including a plurality of LED elements.

The conventional TIR lens 1 shown in FIG. 29 includes a light-entrance surface which has a concave shape or concave lens portion 3 disposed at a lower portion of the TIR lens to surround a periphery of the optical axis AX and configured to allow light from the light source 2 to enter inside the TIR lens 1, and a light-reflection surface has convex shape or convex lens portion 4 disposed to surround the concave lens portion 3 and configured to totally internally reflect the light entering from the concave lens portion 3 at a surface of the convex lens portion 4 toward a light-exit surface side of the TIR lens 1.

The lens member 10 has prisms 13 and 13A-13C each configured by a prism light-entrance surface 13a corresponding to the divided regions 3a-3c of the concave lens portion 3, and a prism light-reflection surface 13b corresponding to the divided regions 4a-4c of the convex lens portion 4 configured to totally internally reflect the light entering from the divided regions 3a-3c. These prism light-entrance surface 13a and prism light-reflection surface 13b configure, respectively, an inner annular surface and an outer annular surface of the prisms 13.

That is, as shown in FIG. 29 and FIG. 3, the divided region 3a on an inner side of a central portion vicinity in the concave lens portion 3 of the conventional TIR lens 1, and the divided region 4a on an outer side of an outer peripheral area vicinity of the convex lens portion 4, where light entering from the divided region 3a is totally internally reflected, undergo a Fresnel lens conversion and thereby correspond, respectively, to the prism light-entrance surface 13a and prism light-reflection surface 13b of the prisms 13A in a central portion vicinity of the lens member 10.

In addition, the divided region 3c on an outer side near the convex lens portion 4 in the concave lens portion 3 of the conventional TIR lens 1, and the divided region 4c on an inner side of an inner peripheral portion vicinity of the convex lens portion 4, where light entering from the divided region 3c is totally internally reflected, correspond, respectively, to the prism light-entrance surface 13a and prism light-reflection surface 13b of the prism 13C in an outer peripheral portion vicinity of the lens member 10.

In this way, the Fresnel lens surface 14 of the lens member 10 is configured such that the more outwardly positioned of the divided regions 4a-4c of the convex lens portion 4 of the conventional TIR lens 1 that a prism 13 corresponds to, the more inwardly that that prism 13 is disposed, and the more inwardly positioned of the divided regions 4a-4c that a prism 13 corresponds to, the more outwardly that that prism 13 is disposed. Consequently, each of the prisms 13 has an apex angle that changes according to position relative to the light source 2. In this way, the plurality of concentric annular prisms having angles of refraction that differ from each other are formed continuously from a position close to the central axis of the light source-facing surface 15 toward a peripheral edge of the light source-facing surface 15, but the prisms positioned at the peripheral edge of the light source-facing surface 15 are set higher than the prisms positioned close to a convex lens portion 12.

In addition, the lens member 10 includes on its optical axis AX the convex lens portion 12 configured to focus the entering light, the convex lens portion 12 corresponding to a convex lens portion 1a formed protruding at a center of the conventional TIR lens 1. That is, the convex lens portion 12 protruding toward the light source 2 is provided at a center of the toric Fresnel lens surface 14. This convex lens portion 12 is, for example, a convex refractive lens configured by a non-spherical surface.

The above-mentioned prism light-entrance surface 13a is directed to the light source 2 side at an incline to the optical axis AX. Further, the prism light-entrance surface 13a is configured by a concentric concave surface, planar surface, or convex quadric surface, but is preferably configured by a planar surface in consideration of processability. At the same time, the above-mentioned prism light-reflection surface 13b is configured by a concentric planar surface, convex surface, or quadric surface such as a paraboloidal surface, hyperboloidal surface, or ellipsoidal surface, but is preferably configured by a planar surface in consideration of processability. Note that, in the lens member 10 shown in FIGS. 2 and 3, a light-exit surface 16, which is on an opposite side to the Fresnel lens surface 14 formed as the light source-facing surface, is formed by a planarized surface, but may be formed having minute irregularities (not shown) configured to control spread of emitted light.

Next, entrance and exit of light from the light source 2 in the lens member 10 of the first embodiment is described. For example, in the lens member 10 of the first embodiment in which the conventional TIR lens 1 shown in FIG. 29 is Fresnel lens-converted as shown in FIG. 3, light L1 of strongest light intensity emitted in a directly upward direction from the light source 2 is focused by the convex lens portion 12 lying on the optical axis AX of the light source 2 to be emitted from a center of the light-exit surface on an opposite side, similarly to the TIR lens 1.

Moreover, in the TIR lens 1, light L2 of relatively strong light intensity in the central portion vicinity emitted in a slightly inclined direction with respect to the optical axis AX of the light source 2 enters from the light-entrance surface (divided region 3a) of the concave lens portion 3 on an inner side and is totally internally reflected at a light-reflection surface (divided region 4a) on an outer side of the convex lens portion 4 to be emitted from an outer peripheral portion vicinity of the light-exit surface.

In contrast, in the lens member 10 of the first embodiment, light L2 of relatively strong light intensity in the central portion vicinity emitted in a slightly inclined direction with respect to the optical axis AX of the light source 2 enters from the prism light-entrance surface 13a of the inner side prisms 13A and is totally internally reflected at the prism light-reflection surface 13b of those prisms 13A to be emitted from a central portion vicinity of the light-exit surface.

Furthermore, in the above-described TIR lens 1, light L3 of relatively weak light intensity emitted in a highly inclined direction with respect to the optical axis AX of the light source 2 enters from the light-entrance surface (divided region 3c) of the concave lens portion 3 on an inner side and is totally internally reflected at a light-reflection surface (divided region 4c) on an inner side of the convex lens portion 4 to be emitted from a central portion vicinity of the light-exit surface.

In contrast, in the lens member 10, light L3 of relatively weak light intensity emitted in a highly inclined direction with respect to the optical axis AX of the light source 2 enters from the prism light-entrance surface 13a of the outer side prism 13C and is totally internally reflected at the prism light-reflection surface 13b of that prism 13C to be emitted from an outer peripheral portion vicinity of the light-exit surface.

Figure 4:
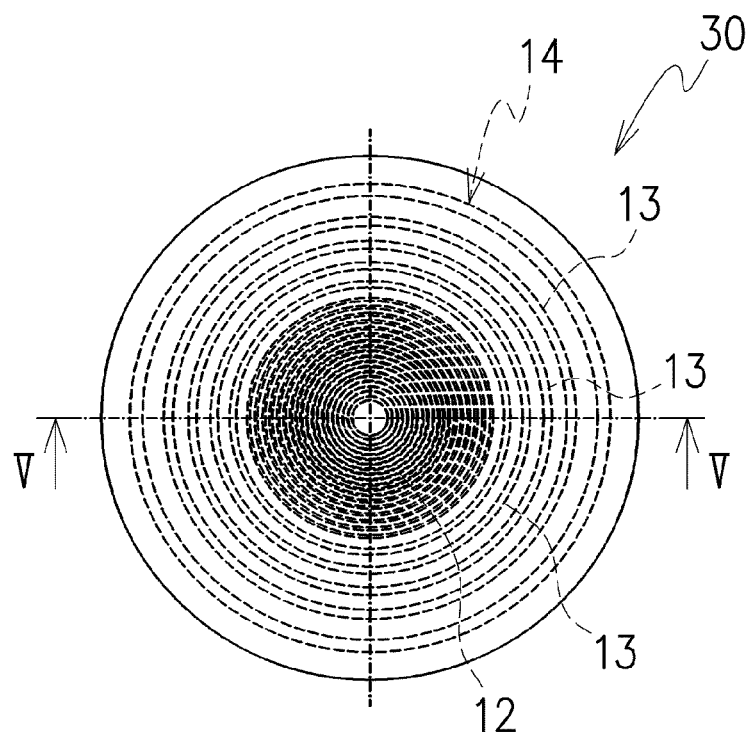
FIG. 4 is a plan view of a lens member in accordance with a second embodiment of the present invention.
Figure 5:
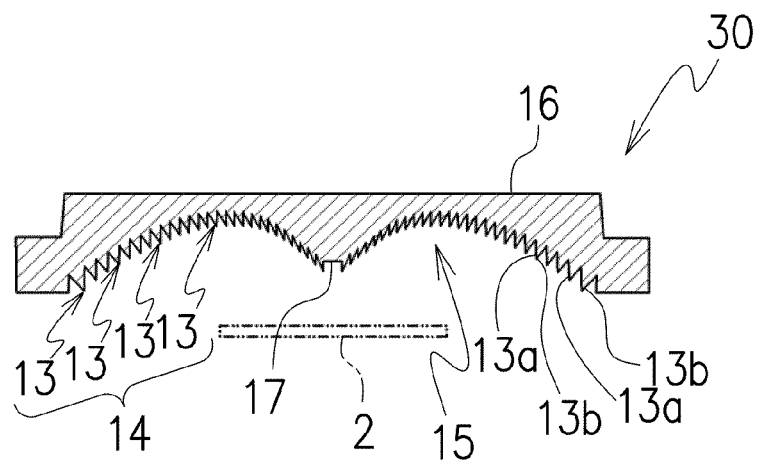
FIG. 5 is a cross-sectional view taken along the line V-V of the lens member shown in FIG. 4.

A lens member 30 in accordance with a second embodiment of the present invention is shown in FIGS. 4 and 5. Note that in the second embodiment identical symbols are assigned to configurations similar to those of the first embodiment. The lens member 30 of this second embodiment is a TIR lens in which the Fresnel lens surface 14 (refer to FIG. 3) comprising the plurality of prisms 13 and 13A-13C having differing angles of refraction is formed as a light-entrance surface on the light source-facing surface 15, similarly to the lens member 10 of the first embodiment, but has shapes of each of the prisms 13 and 13A-13C differing from those in the lens member 10 of the first embodiment.

That is, formed on the central axis of the light source-facing surface 15 is a protruding portion 17 protruding in a conic shape toward the light source 2 disposed to face the light source-facing surface 15. Further, an apex of the protruding portion 17 lies on the central axis of the light source-facing surface 15, and the plurality of concentric annular prisms 13 and 13A-13C having angles of refraction that differ from each other are formed continuously from a position close to the apex of the protruding portion 17 toward a peripheral edge of the light source-facing surface 15. Moreover, each of the prisms 13 and 13A-13C includes the prism light-entrance surface 13a and prism light-reflection surface 13b. Note that the lens member 30 is also formed in an integrated manner from a light-transmitting material such as an acrylic resin. Note also that, in the second embodiment, the so-called multi-chip LED having a plurality of LED elements disposed in a grid pattern is adopted for the light source 2, similarly to the first embodiment.

Figure 6:
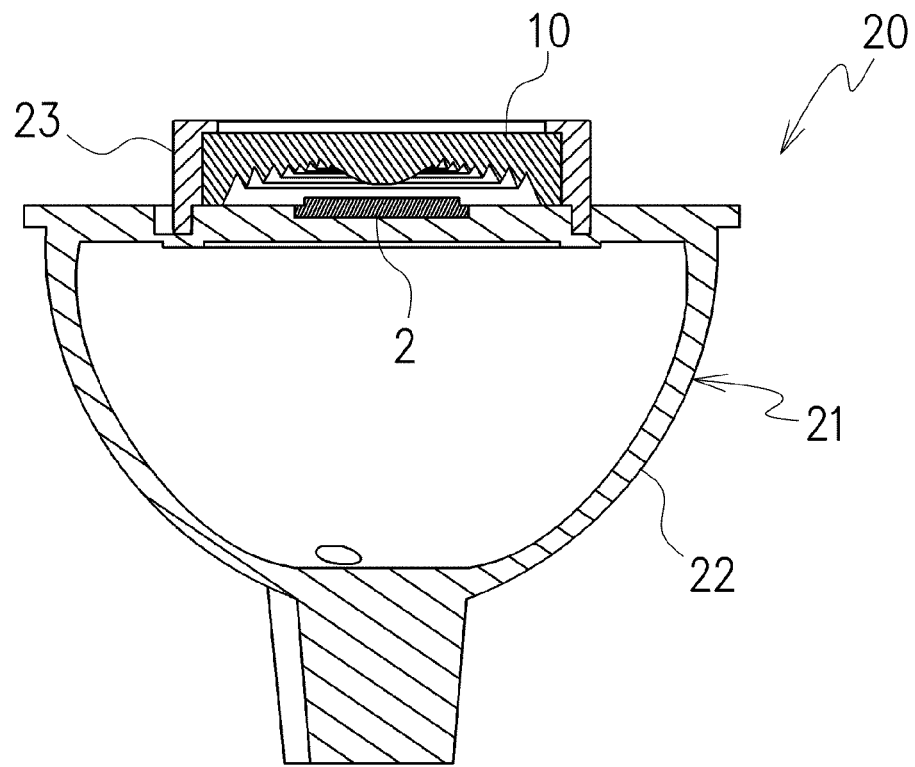
FIG. 6 is a cross-sectional view of an optical unit installed with the lens member in accordance with the first embodiment.
Figure 7:
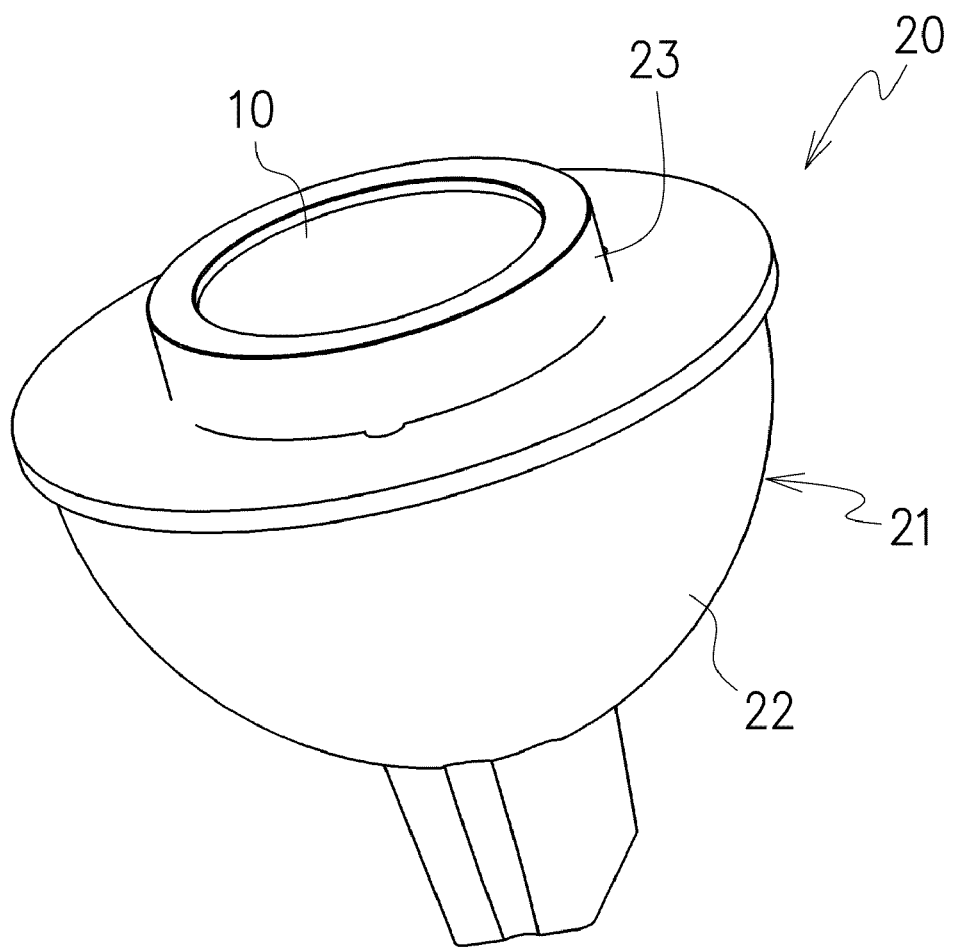
FIG. 7 is a perspective view of the optical unit shown in FIG. 6.

Next, an optical unit installed with the lens member 10 in accordance with the first embodiment is described. As shown in FIGS. 6 and 7, this optical unit 20 has the lens member 10 and an LED acting as the light source 2 housed in a casing 21. The casing 21 comprises a hemispherical portion 22 having the light source 2 installed in a center of an upper surface portion thereof, and a substantially cylindrical lens support frame 23 installed on the upper surface portion of the hemispherical portion 22 for housing the lens member 10. Note that the lens support frame 23 is installed on the upper surface portion of the hemispherical portion 22 in a state where the lens member 10 faces the light source 2 and the central axis of the lens member 10 is aligned with a center of the light source 2.

Next, results of performing a simulation on luminance characteristics of the lens member 10 in accordance with the first embodiment are described in comparison with the conventional TIR lens 1.

Figure 8A:
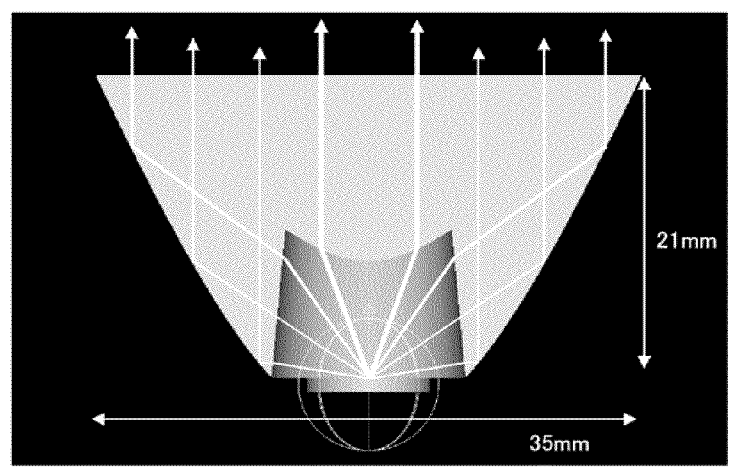
FIG. 8A is a cross-sectional view of a conventional TIR lens set for simulation.
Figure 8B:
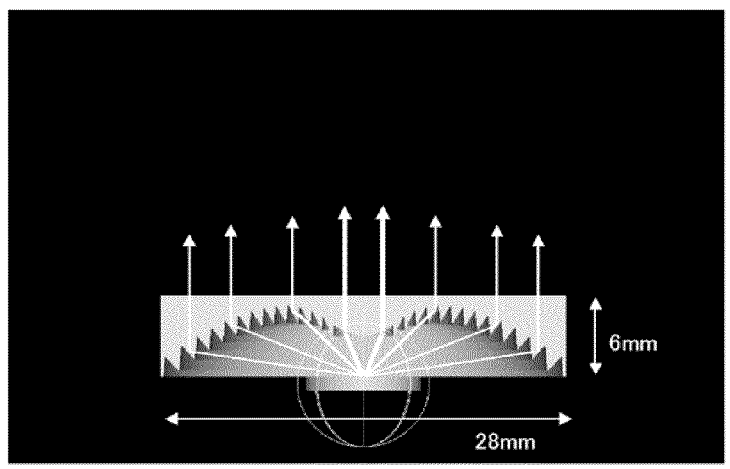
FIG. 8B is a cross-sectional view of the lens member in accordance with the first embodiment set for simulation.
Figure 9A:
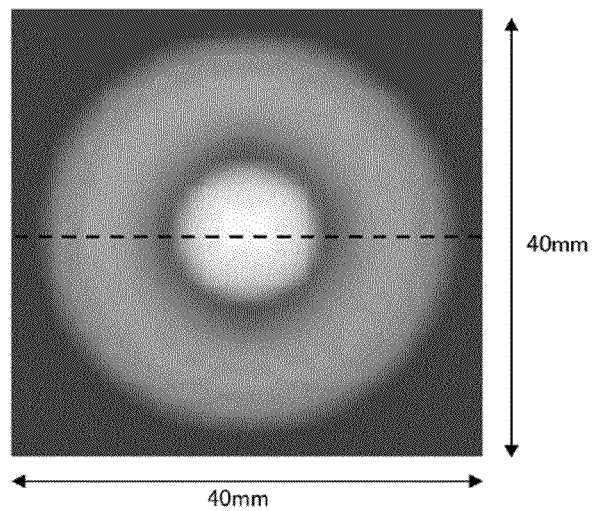
FIG. 9A is a luminance characteristic diagram where shading is used to show a luminance distribution at a light-exit surface due to simulation for the conventional TIR lens.
Figure 10A:
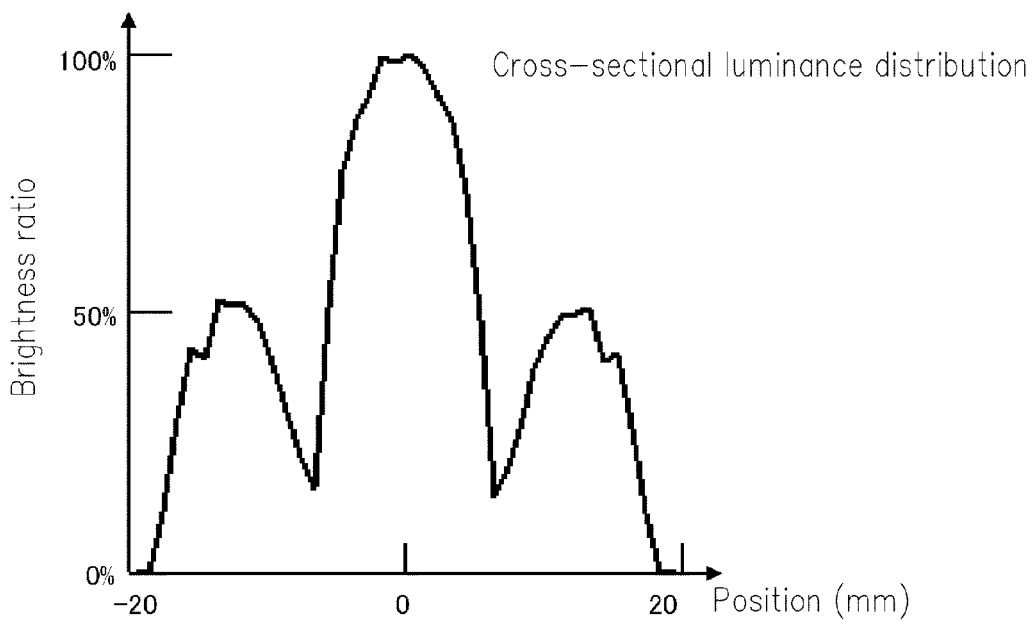
FIG. 10A is a graph showing a cross-sectional luminance distribution due to simulation for the conventional TIR lens.
Figure 10B:
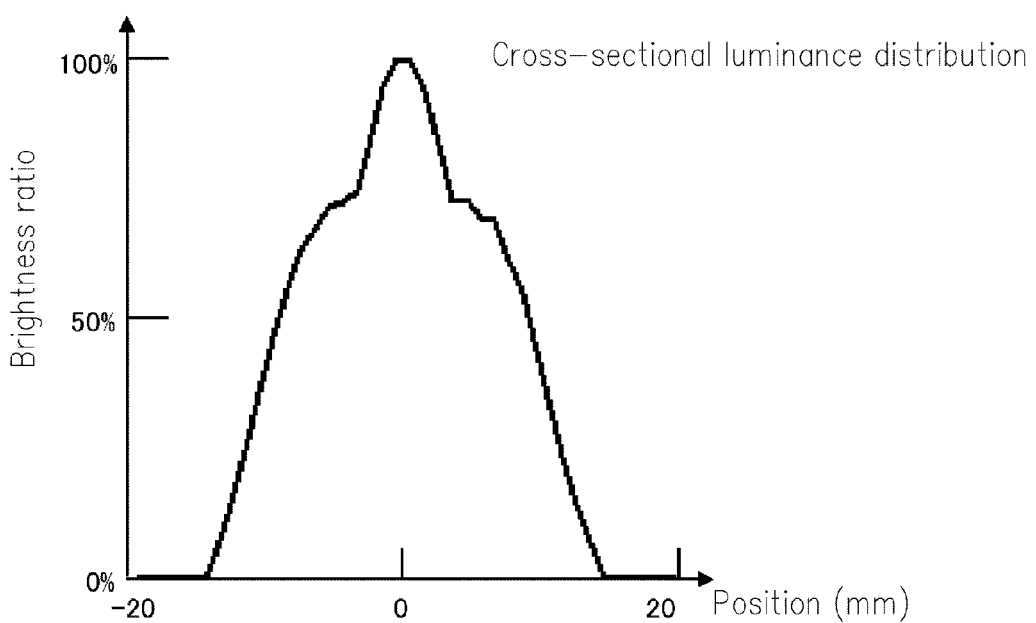
FIG. 10B is a graph showing a cross-sectional luminance distribution due to simulation for the lens member in accordance with the first embodiment.

FIGS. 8A and 8B are respective cross-sectional views of the conventional TIR lens 1 and the lens member 10 in accordance with the first embodiment set for simulation. First, when a simulation is performed of luminance distribution at the light-exit surface of the conventional TIR lens 1 shown in FIG. 8A, ring-shaped flare is found to be generated as shown in FIG. 9A, and in the simulation result for cross-sectional luminance distribution, drops in luminance are found to occur as shown in FIG. 10A.

Figure 9B:
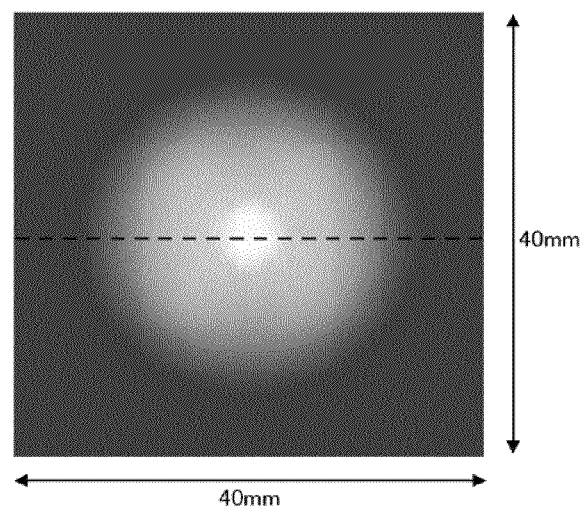
FIG. 9B is a luminance characteristic diagram where shading is used to show a luminance distribution at a light-exit surface due to simulation for the lens member in accordance with the first embodiment.

In contrast, when a simulation is performed of luminance distribution at the light-exit surface of the lens member 10 of the first embodiment shown in FIG. 8B, ring-shaped flare of the kind generated in the TIR lens 1 does not occur as shown in FIG. 9B. Moreover, in the simulation result for cross-sectional luminance distribution, brightness is found to lower gradually from a center toward an outer side, whereby appearance is improved. Note that the above-described luminance characteristics are light directivity FWHM (full-width-at-half-maximum) simulations.

Since the Fresnel lens surface 14 in the lens member 10 of the first embodiment is configured in this way such that the prism 13A corresponding to a more outwardly positioned divided region 3c of the concave lens portion 3 in the conventional TIR lens 1 is disposed more inwardly, and the prism 13C corresponding to a more inwardly positioned divided region 3a is disposed more outwardly, light of relatively strong light intensity in the central portion vicinity enters from the prism light-entrance surface 13a of the inner side prism 13A and is totally internally reflected at the prism light-reflection surface 13b of that prism 13A.

Consequently, the strong light emitted at the outer side in the conventional TIR lens 1 or a conventional Fresnel lens can be emitted at an intermediate vicinity of the inner side in the lens member 10 of the first embodiment. In addition, since the convex lens portion 12 is included on the optical axis AX, entering light is further focused, enabling brightness of the central portion to be increased.

This allows a luminance distribution to be obtained in the lens member 10 of the first embodiment in which the center is bright and the outer side is dark with the brightness gradually lowering from the center toward the outer side, and enables generation of ring-shaped flare to be suppressed and appearance to be improved. Moreover, since the inner surface serving as light-entrance surface and outer annular surface serving as light-reflection surface of each of the prisms 13 is formed in a continuum via a ridge line, all the light entering from the light-entrance surface reaches the light-reflection surface to be totally internally reflected, whereby usage efficiency of light can be dramatically improved. Note that light-focusing capability of the Fresnel lens surface 14 can be further increased by increasing the number of divisions during Fresnel conversion.

In addition, since the prism light-reflection surface 13b is formed in a planar shape, processing becomes extremely easy and manufacture can be achieved at low cost. Furthermore, since the prism light-entrance surface 13a is directed to the light source 2 side at an incline with respect to the optical axis AX, light can enter easily and, since the prism light-entrance surface 13a and the optical axis AX are not parallel, demoldability during molding can be improved and a high quality lens member 10 obtained.

Moreover, forming the minute regularities for controlling spread of emitted light on the light-exit surface opposite to the Fresnel lens surface 14 makes it easy to emit light focused as much as possible by the Fresnel lens surface 14 with a desired directivity by using the irregularities of the light-exit surface 16.

The optical unit 20 provided with the lens member 10 thus makes it possible to obtain, for example, LED optical products, such as lighting, projectors, flash, headlamps and tail lamps of automobiles and the like, that have high usage efficiency of light emitted from the LED light source 2 and have an excellent appearance.

Figure 11:
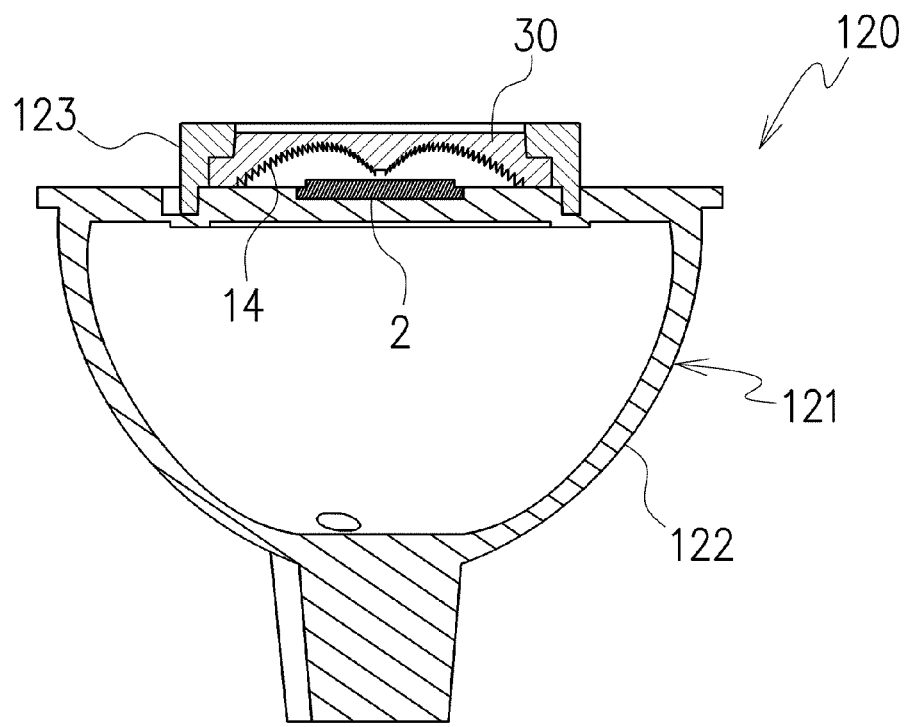
FIG. 11 is a cross-sectional view of an optical unit installed with the lens member in accordance with the second embodiment.

An optical unit 120 installed with the lens unit 30 in accordance with the second embodiment is shown in FIG. 11. Similarly to the previously described case for the first embodiment, the optical unit 120 has the plate-shaped lens member 30 and an LED acting as the light source 2 housed in a casing 121. In the above stated embodiments, intensity of light exited from the light-exit surface of the plate-shaped lens member is explained with configuration of the plate-shaped lens, but in this embodiment, a plate-shaped lens member 30 is explained when used with a light source in which at least one LED element is sealed by a sealing resin including a fluorescent material or phosphors; at least one blue light-emitting diode element (a blue LED element) sealed by a sealing resin including YAG as phosphors, for example. Light emitted from this light source 2 appears to be white light by mixing effect of blue light emitted from the blue LED element and yellow light after passing through the YAG phosphors. Light along a direction of the optical axis of the light source tends to appear to be bluish white, though light emitted in adjacent area of a lateral direction crossing the optical axis tends to appear to be yellowish white, because of different intensity of light in directions.

The casing 121 comprises a hemispherical portion 122 having the light source 2 installed in a center of an upper surface portion thereof, and a substantially cylindrical lens support frame 123 installed on the upper surface portion of the hemispherical portion 122 for housing the lens member 30. Moreover, the lens support frame 123 is installed on the upper surface portion of the hemispherical portion 122 in a state where the lens member 30 faces the light source 2 and the central axis of the lens member 30 is aligned with the center of the light source 2.

Figure 12:
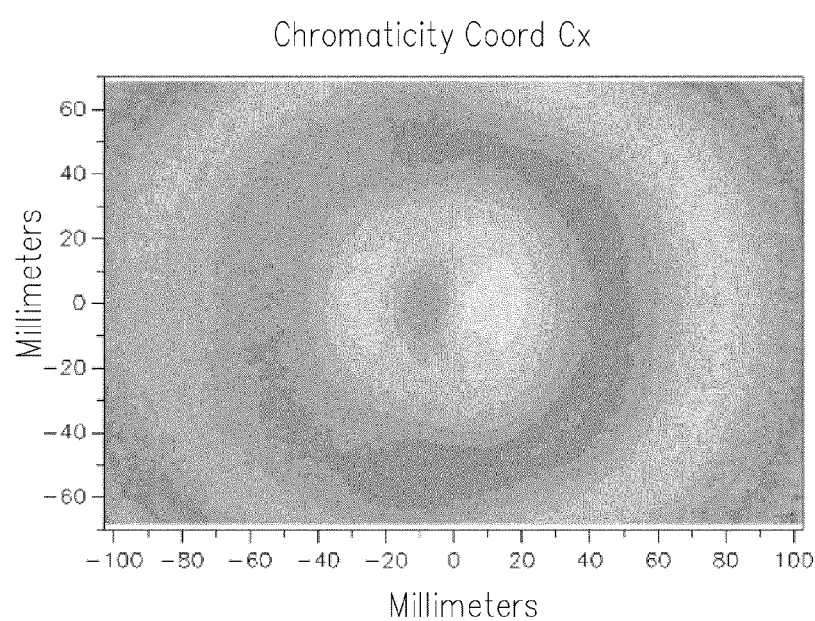
FIG. 12 is an image showing color variability used with an LED element sealed by a sealing resin including phosphors mixed in the resin as a light source and the lens member in accordance with the second embodiment.
Figure 13:
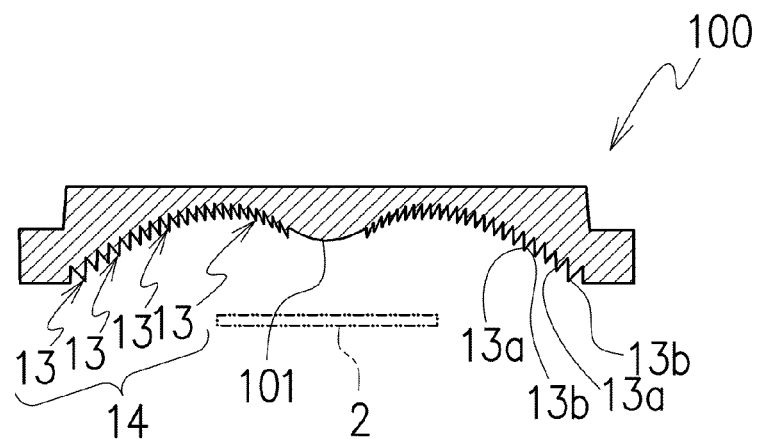
FIG. 13 is a cross-sectional view of a lens member for comparing color variability with the lens member in accordance with the second embodiment, when used with an LED element sealed by a sealing resin including phosphors.
Figure 14:
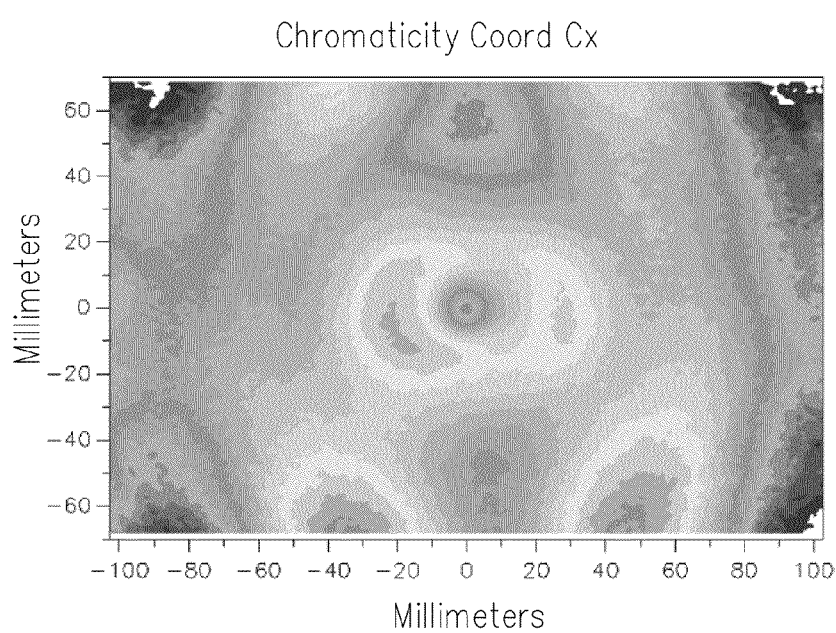
FIG. 14 is an image showing color variability in the lens member shown in FIG. 13.

Next, chromaticity of illuminating light after being passed through the plate-shaped lens member 30 of the second embodiment is investigated. Results are shown in FIG. 12. In addition, for comparison, color variability is similarly investigated also for a comparison-purpose lens member 100 having a convex lens portion 101 integrally formed in a central portion of the light-entrance surface, as shown in FIG. 13. Results are shown in FIG. 14. Note that the color variability images shown in FIGS. 12 and 14 are color images converted to grayscale black-and-white images.

On comparison, it is found that, whereas in the lens member 100 used for purposes of comparison there is color variability with locally occurring yellowish regions and bluish regions, in the lens member 30 of the second embodiment color variability is reduced overall with few yellowish or bluish regions.

Note that the even if light source 2, which may have a plurality of blue LED elements arranged therein, is disposed in the above-mentioned optical unit 120 and even if there are several optical axes of the LED elements; the concentric annular prisms 13 formed adjacent to the central portion of the lens member 30 prevents color variability at a central portion of the plate-shaped lens. The concentric annular prisms 13 at the central portion are preferably provided more densely or closely, compared to the concentric annular prisms 13 at a peripheral portion of the plate-shaped lens.

Figure 15:
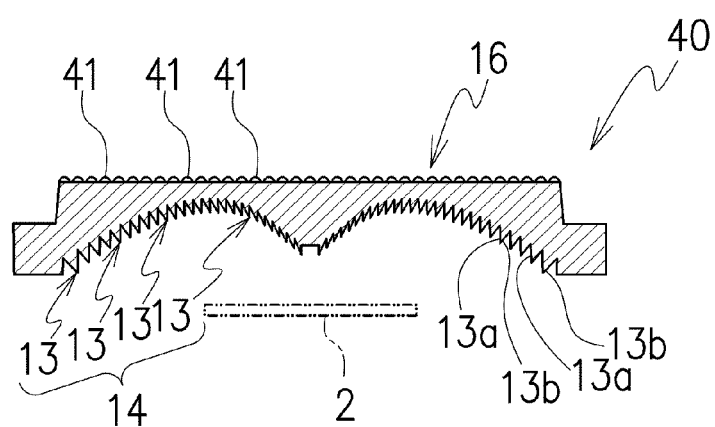
FIG. 15 is a cross-sectional view of a lens member in accordance with a third embodiment of the present invention.

Next, a lens member in accordance with a third embodiment of the present invention is described below with reference to FIGS. 15 and 16. Note that in the third embodiment identical symbols are assigned to elements of configuration identical to those described in the second embodiment, and a description thereof is thus omitted.

A lens member 40 of the third embodiment has a basic shape the same as that of the lens member of the second embodiment, and differs only in a shape of the light-exit surface 16 opposite to the Fresnel lens surface 14. That is, whereas the light-exit surface 16 opposite to the Fresnel lens surface 14 in the lens member 30 of the second embodiment is a planarized surface, the light-exit surface 16 opposite to the Fresnel lens surface 14 in the lens member 40 of the third embodiment has a plurality of irregularities 41 formed thereon, as shown in FIGS. 15 and 16, the plurality of irregularities 41 being configured to control at least one of diffusion capability and directivity of the light emitted from the light-exit surface 16.

Figure 16:
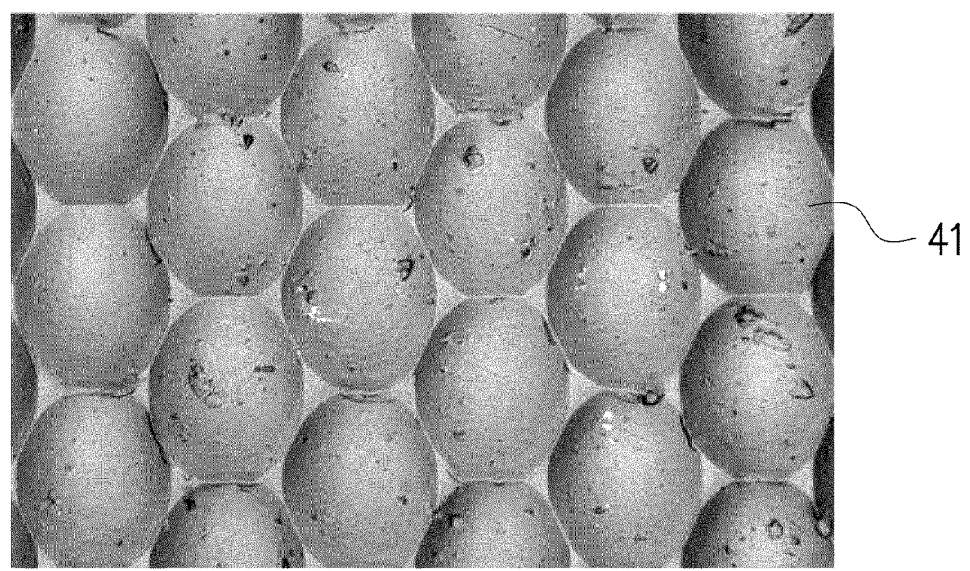
FIG. 16 is an enlarged plan view showing a light-exit surface of the lens member in accordance with the third embodiment.

As shown in FIG. 16, the irregularities in this third embodiment are a plurality of elliptically-shaped convex portions 41 arranged on the light-exit surface 16, the convex portions having diffusion capability for diffusing emitted light. Note that the convex portions 41 preferably have a non-spherical surface in order to efficiently refract light. Moreover, the convex portions may also have a quadrangular pyramid shape, for example.

Figure 17:
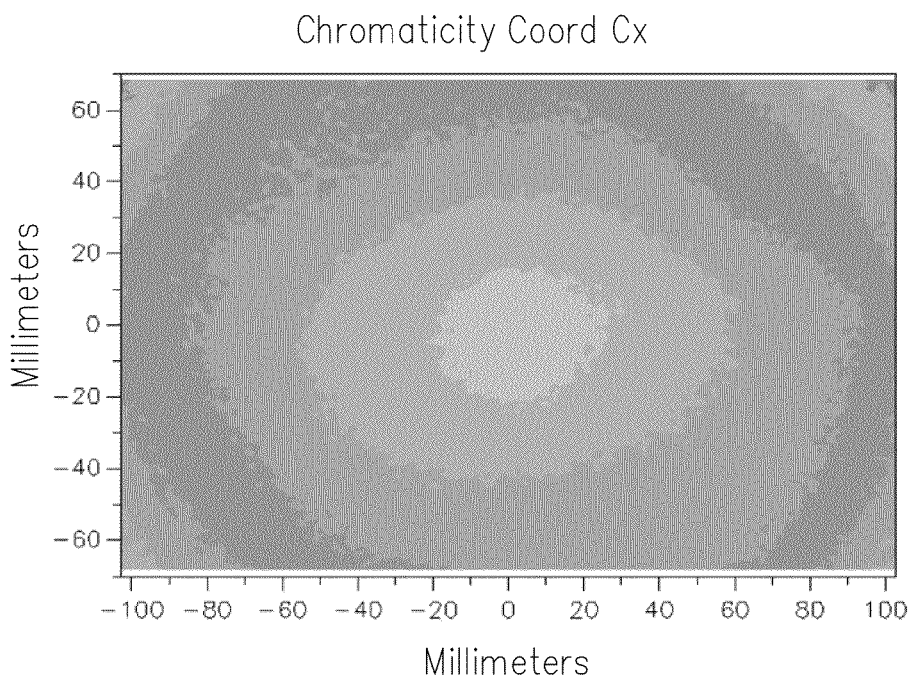
FIG. 17 is an image showing color variability in the lens member in accordance with the third embodiment, when used with an LED element sealed by a sealing resin including phosphors.

In FIG. 17, color variability of the lens member 40 in accordance with the third embodiment is investigated. This image shows color variability to be further reduced compared to the lens member 30 of the second embodiment.

Having the convex portions 41 for controlling at least one of diffusion capability and directivity of the emitted light formed on the light-exit surface 16 opposite to the Fresnel lens surface 14 in the lens member 40 of the third embodiment in this way makes it easy to emit light focused as much as possible by the Fresnel lens surface 14 with desired diffusion capability or directivity by using the refraction and scattering due to the convex portions 41 of the light-exit surface 16.

Figure 18:
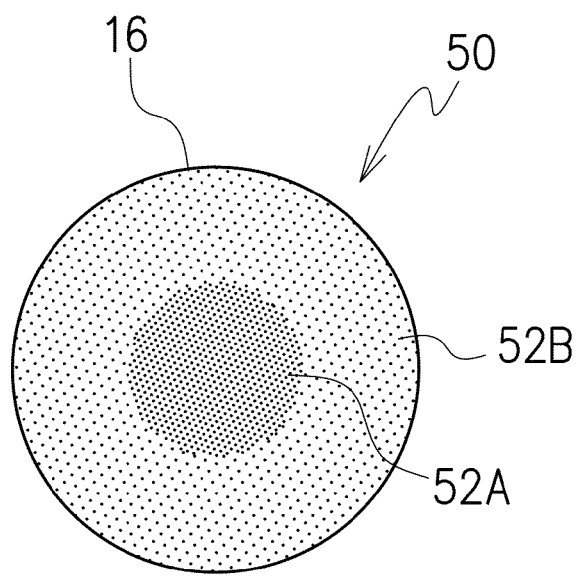
FIG. 18 is a schematic view showing a light-exit surface of a lens member in accordance with a fourth embodiment of the present invention.
Figure 19A:
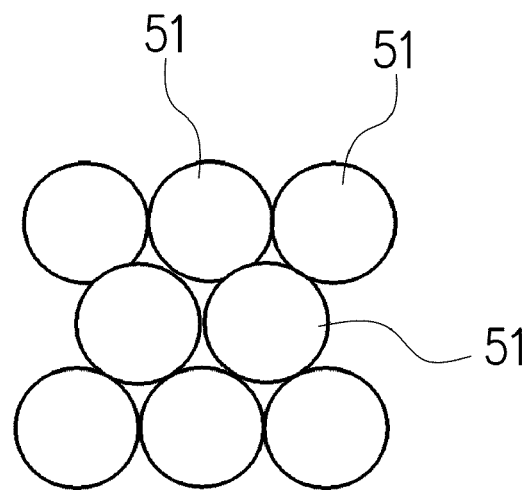
FIG. 19A is an enlarged plan view schematically showing irregularities formed in a central portion of the light-exit surface of the lens member in accordance with the fourth embodiment of the present invention.
Figure 19B:
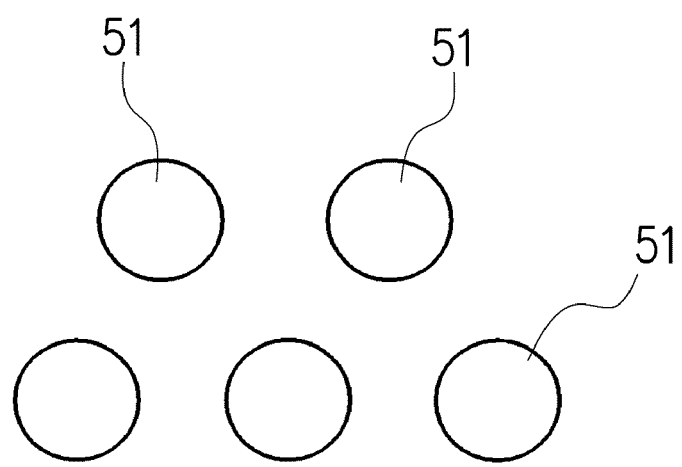
FIG. 19B is an enlarged plan view schematically showing irregularities formed in an outer peripheral area of the light-exit surface of the lens member in accordance with the fourth embodiment of the present invention.

In FIGS. 18 and 19, a light-exit surface 16 of a lens member 50 in accordance with a fourth embodiment is shown schematically. Whereas the lens member 40 in accordance with the third embodiment has the convex portions 41 arranged uniformly on the entirety of the light-exit surface 16, the lens member 50 in accordance with the fourth embodiment has a light-exit surface 16 having a central portion comprising a region of higher diffusion capability than a peripheral portion. That is, while the central portion of the light-exit surface 16 has convex portions 51 formed thereon with high density as shown in FIG. 19A, the peripheral portion of the light-exit surface 16 has the convex portions 51 formed thereon with low density as shown in FIG. 19B. This results in a high-diffusion-capability region 52A of high light diffusion capability being formed on the central portion of the light-exit surface 16, and a low-diffusion-capability region 52B of low light diffusion capability being formed on the peripheral portion of the light-exit surface 16, as shown in FIG. 18.

As described above, in the lens member 50 of the fourth embodiment, the central portion of the light-exit surface 16 has a higher light diffusion capability than the peripheral portion thereof, and there is thus more light diffused at the central portion where color variability of the light source 2 is particularly easily seen, thereby enabling color variability to be effectively suppressed; on the other hand, light diffusion capability at the peripheral portion of the light-exit surface 16 is lower than at the central portion thereof, thus making it possible also to suppress a lowering of frontal illuminance and to obtain narrow directivity.

Note that in the fourth embodiment, a difference in light diffusion capability can also be imparted by changing the shape of the convex portions 51 formed in the central portion and peripheral portion of the light-exit surface 16. That is, as shown in FIGS. 20A and 20B, the light diffusion capability can be raised by setting a height of the convex portions 51 formed in the high-diffusion-capability region 52A of the central portion greater than a height of the convex portions 51 formed in the low-diffusion-capability region 52B of the peripheral portion.

Figure 20A:
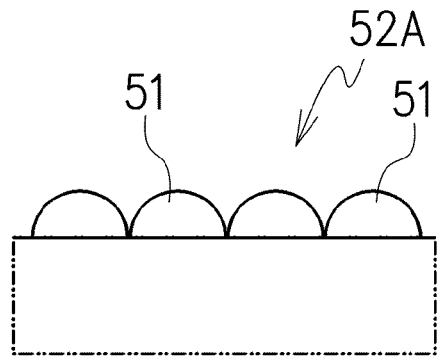
FIG. 20A is an enlarged schematic cross-sectional view showing an example of the irregularities in the light-exit surface of the lens member in accordance with the fourth embodiment of the present invention.
Figure 20B:
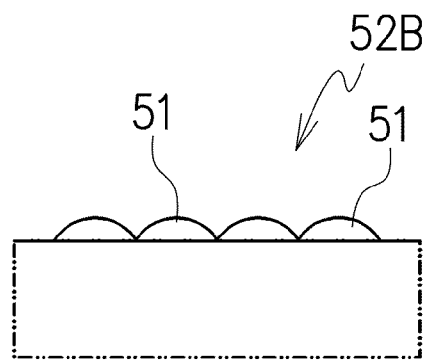
FIG. 20B is an enlarged schematic cross-sectional view showing another example of the irregularities in the light-exit surface of the lens member in accordance with the fourth embodiment of the present invention.
Figure 20C:
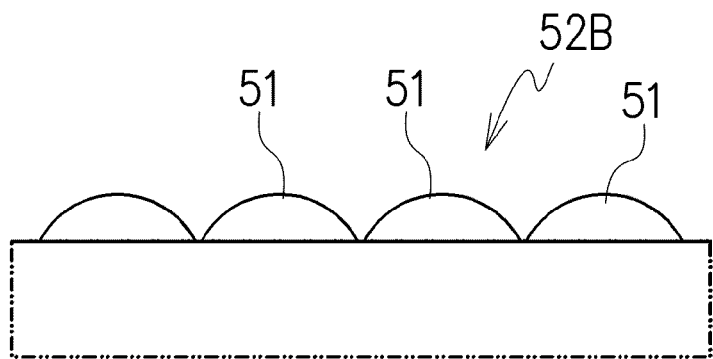
FIG. 20C is an enlarged schematic cross-sectional view showing yet another example of the irregularities in the light-exit surface of the lens member in accordance with the fourth embodiment of the present invention.

Moreover, as shown in FIGS. 20A and 20C, the light diffusion capability can also be raised by setting curvature of the convex portions 51 formed in the high-diffusion-capability region 52A of the central portion less than curvature of the convex portions 51 formed in the low-diffusion-capability region 52B of the peripheral portion.

Note that in the embodiment shown in FIG. 18, the case is described where the high-diffusion-capability region 52A and low-diffusion-capability region 52B are clearly divided. However, the density or height, or the curvature, and so on, of the convex portions 51 may be changed gradually, thereby increasing the diffusion capability smoothly from an outer side to an inner side.

Figure 21:
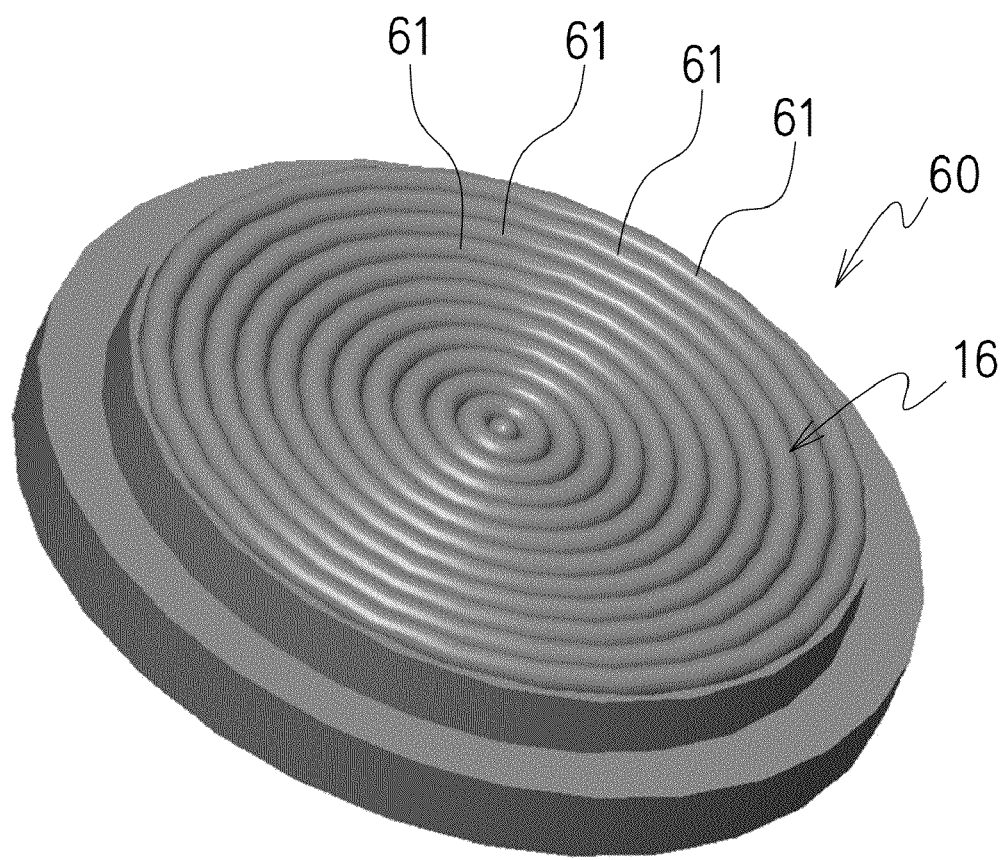
FIG. 21 is a perspective view of a light-exit surface side of a lens member in accordance with a fifth embodiment of the present invention.

FIG. 21 shows a light-exit surface 16 of a lens member 60 in accordance with a fifth embodiment of the present invention. Whereas the light-exit surfaces in the previously mentioned lens members of the third and fourth embodiments are provided with a plurality of dot-shaped convex portions, the light-exit surface 16 in the lens member 60 of the fifth embodiment has a plurality of ring-shaped convex portions 61 formed concentrically thereon. The convex portions 61 have, for example, a semicylindrical shape of arc-shaped cross-section.

Figure 22A:
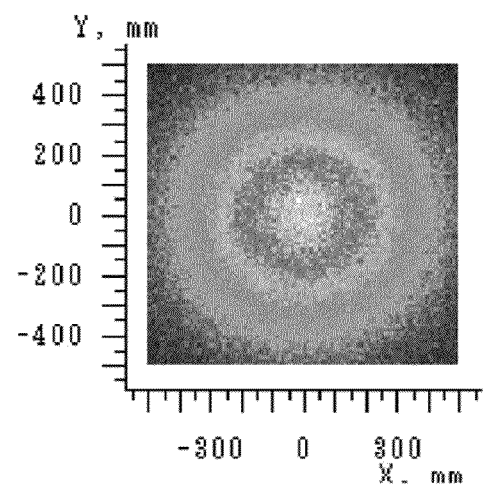
FIG. 22A is an image showing an illuminance distribution for the lens member in accordance with the fifth embodiment of the present invention.
Figure 22B:
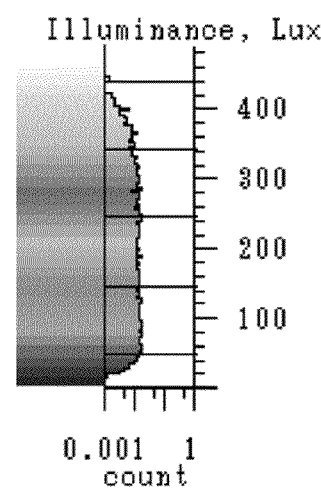
FIG. 22B is a color-coded illuminance chart explaining the image in FIG. 22A for the lens member in accordance with the fifth embodiment of the present invention.

FIG. 22A shows an illuminance distribution image for the lens member 60 in accordance with the fifth embodiment, and FIG. 22B is a color-coded illuminance chart. The scale (mm) shown in FIG. 22A represents size of the lens, and the scale (Lux) shown in FIG. 22B represents magnitude of illuminance. Note that FIG. 22A is a color image of the illuminance distribution converted to a grayscale black-and-white image, and shows how an isotropic diffusion capability is obtained such that, the closer to the central portion of the lens member 60 facing the light source, the higher the illuminance.

Figure 23:
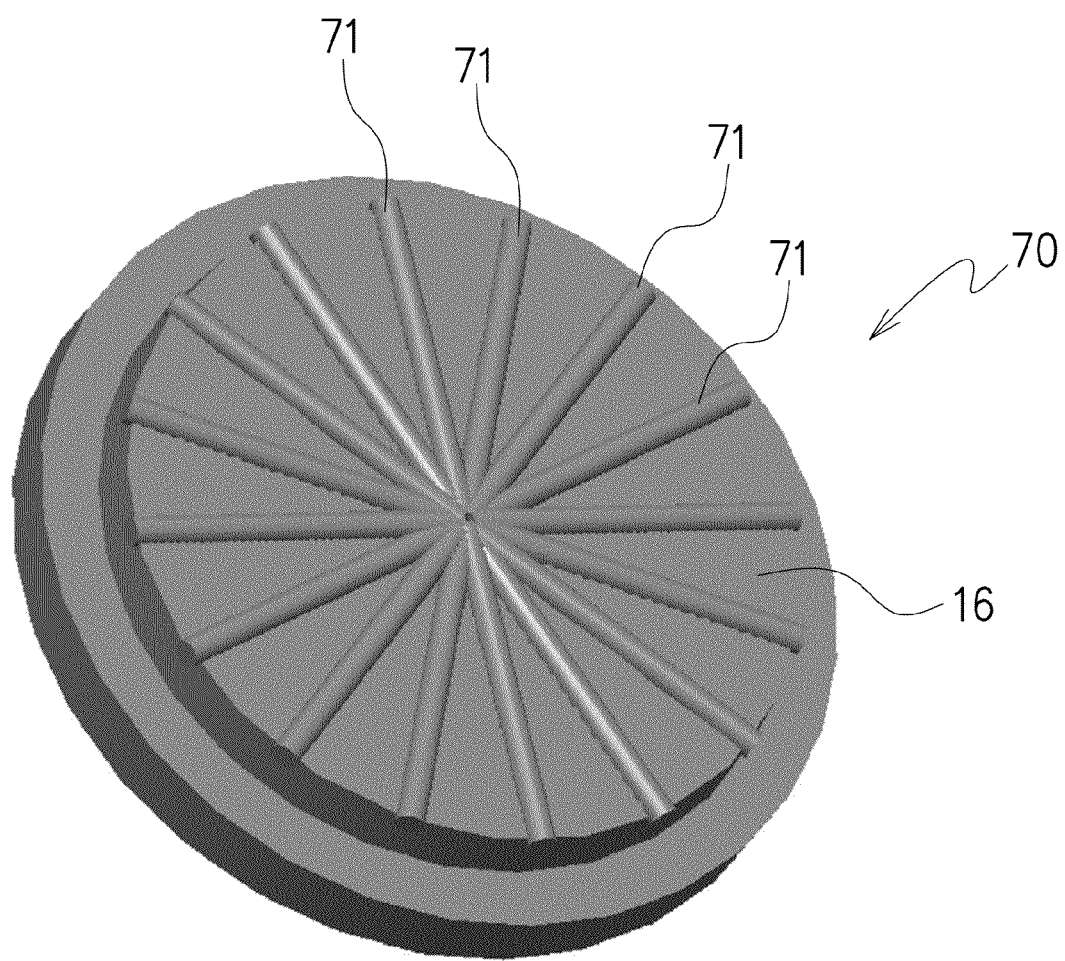
FIG. 23 is a perspective view of a light-exit surface side of a lens member in accordance with a sixth embodiment of the present invention.

FIG. 23 shows a light-exit surface 16 of a lens member 70 in accordance with a sixth embodiment of the present invention. Whereas the light-exit surface in the previously mentioned lens member of the fifth embodiment has the plurality of ring-shaped convex portions formed concentrically thereon, the light-exit surface 16 in the lens member 70 of the sixth embodiment has a plurality of linear convex portions 71 extending radially from a center formed thereon. Note that likewise in this lens member 70 in accordance with the sixth embodiment, similarly to the previous fifth embodiment, an isotropic diffusion capability is obtained such that, compared to the peripheral portion of the light-exit surface 16, the closer to the central portion of the light-exit surface 16, the higher the illuminance.

Figure 24:
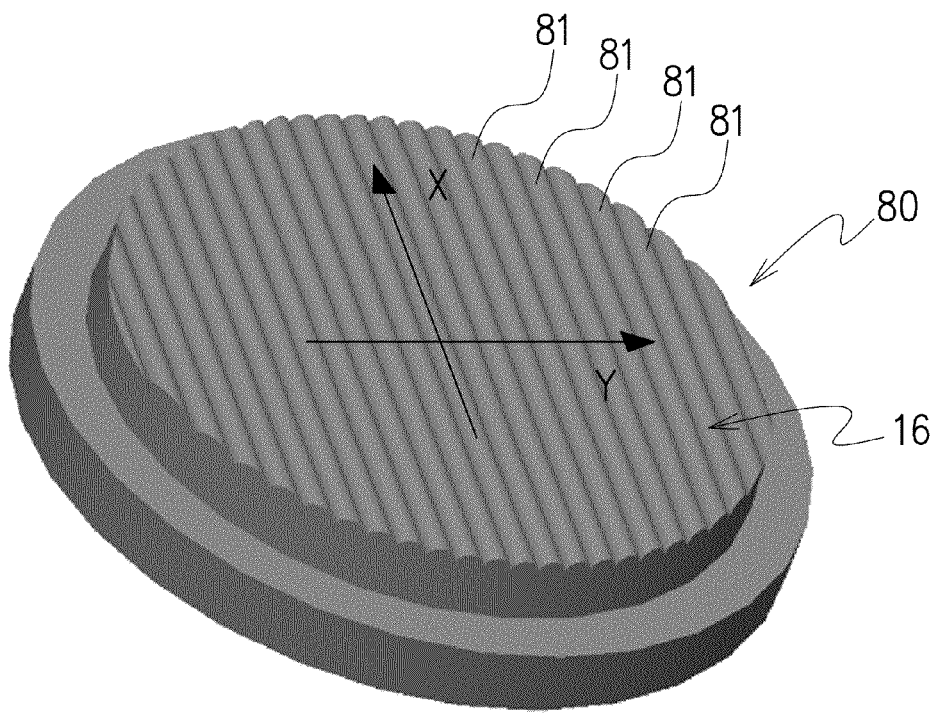
FIG. 24 is a perspective view of a light-exit surface side of a lens member in accordance with a seventh embodiment of the present invention.

FIG. 24 shows a light-exit surface 16 of a lens member 80 in accordance with a seventh embodiment of the present invention. Whereas the light-exit surface 16 in the previously mentioned lens member of the fifth embodiment has the plurality of ring-shaped convex portions 51 formed concentrically thereon, the lens member 80 of the seventh embodiment has a plurality of linear convex portions 81 extending in an X direction arranged in parallel in a Y direction. That is, the linear convex portions 81 are formed on the light-exit surface 16 of the seventh embodiment as anisotropic diffusion shapes, and diffuse a large amount of emitted light in a specific direction.

Figure 25:
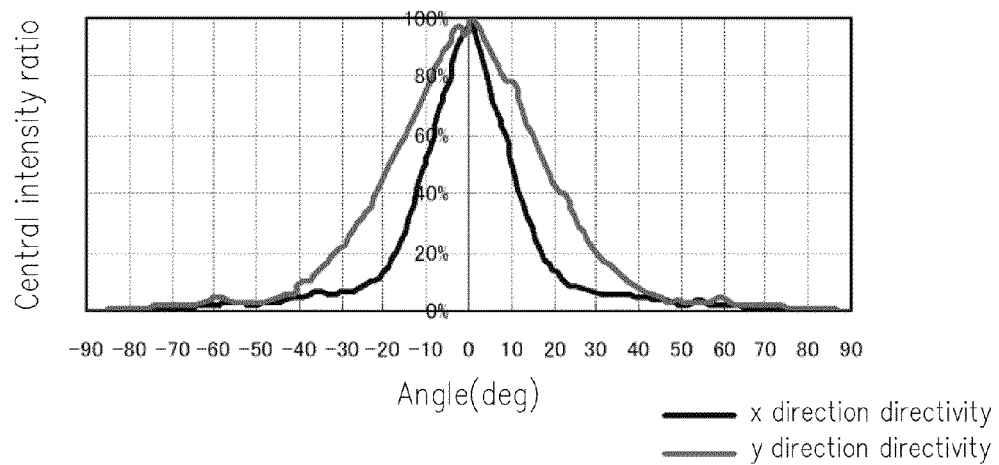
FIG. 25 is graph showing directivity of light in the lens member in accordance with the seventh embodiment of the present invention.
Figure 26A:
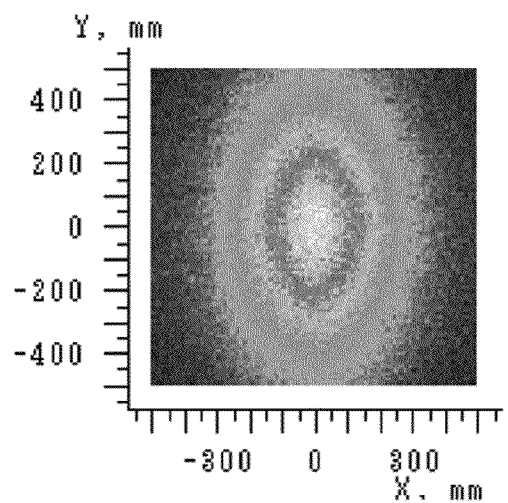
FIG. 26A is an image showing an illuminance distribution for the lens member in accordance with the seventh embodiment of the present invention.
Figure 26B:
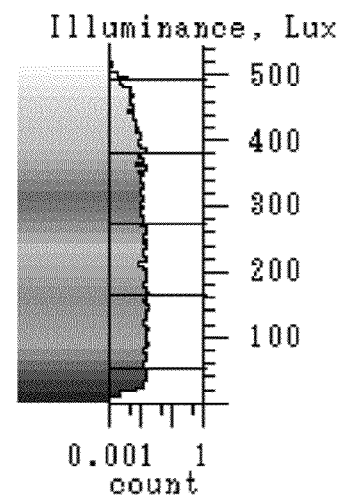
FIG. 26B is a color-coded illuminance chart explaining the image in FIG. 26A for the lens member in accordance with the seventh embodiment of the present invention.

As shown in FIG. 25, the above-described lens member 80 of the seventh embodiment has a directivity that is narrow in a direction of extension of the linear convex portions 81 (X direction) and becomes broader in a direction orthogonal to this direction of extension of the linear convex portions 81 (Y direction). This results in the obtaining of a biased anisotropic diffusion capability in which illuminance rises in the Y direction, as is clear also from the illuminance distribution images shown in FIGS. 26A and 26B.

Giving an anisotropic diffusion shape whereby a large amount of emitted light is diffused in a specific direction to the linear convex portions 81 formed on the light-exit surface 16 in the lens member 80 in accordance with the seventh embodiment in this way makes it possible to impart narrow directivity to light and emit the light in a specific direction, rather than diffuse the light uniformly.

Note that arranging the elliptically-shaped convex portions 41 to all face in an identical direction, as in the previously-mentioned lens member 40 described in the third embodiment, also allows anisotropy whereby a large amount of emitted light is diffused in a specific direction to be obtained. In addition, the case is described in the previously mentioned third through seventh embodiments where the irregular portions formed on the light-exit surface of the lens member are each convex portions protruding from the light-exit surface; however, similar diffusion capability and directivity can also be obtained by forming the light-exit surface as depressed concave portions.

Figure 27:
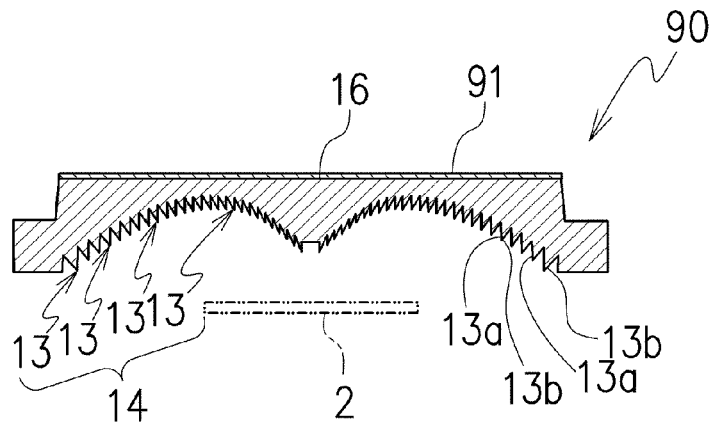
FIG. 27 is a cross-sectional view of a lens member in accordance with an eighth embodiment of the present invention.

FIG. 27 shows a cross-section of a lens member 90 in accordance with an eighth embodiment of the present invention. Whereas the light-exit surface 16 opposite to the Fresnel lens surface 14 in the previously mentioned lens members of the third through seventh embodiments has the irregularities for controlling the diffusion capability and directivity of emitted light formed thereon, the light-exit surface 16 in the lens member 90 of the eighth embodiment has an optical sheet 91 disposed on an entirety thereof, thereby controlling at least one of diffusion capability and directivity of light passing through the optical sheet 91.

The optical sheet 91 is, for example, a diffusion sheet for uniformly scattering transmitted light, an anisotropic diffusion sheet for scattering or refracting a large amount of transmitted light in a specific direction, or a prism sheet. Disposing such an optical sheet 91 on the entirety of the light-exit surface 16 allows a wide variety of light diffusion capabilities and directivities to be set arbitrarily. Note that a material having a small difference in refractive index with the material comprising the lens member 90 is preferably used for the optical sheet 91.

Disposing the optical sheet 91 for controlling at least one of diffusion capability and directivity of transmitted light on the light-exit surface 16 of the lens member 90 in this way makes it easy to emit light focused as much as possible by the Fresnel lens surface 14 with desired diffusion capability or directivity by using the refraction and scattering due to the optical sheet 91 on a light-exit surface 16 side.

Next, the results of measuring in-plane chromaticity variation, frontal illuminance, and full-width-at-half-maximum (FWHM) for the above-described lens member 100 for comparative purposes, the lens member 30 of the second embodiment, the lens member 90 having diffusion sheets with HAZE values of 29% and 46% serving as the optical sheet 91 in the eighth embodiment, and the lens member 40 of the third embodiment are shown in Table 1.

TABLE 1

| | In-plane chromaticity variation | Frontal illuminance | FWHM |
|---|---|---|---|
| Lens member for comparison | 0.029 | 998 | 19.5 |
| Lens member of first embodiment | 0.017 | 986 | 19.5 |
| Lens member of eighth embodiment HAZE 29% | 0.010 | 808 | 23.5 |
| Lens member of eighth embodiment HAZE 46% | 0.004 | 701 | 24.0 |
| Lens member of third embodiment | 0.003 | 732 | 26.0 |

As is clear also from the results shown in Table 1, in-plane chromaticity variation is found to be smaller and color variability reduced compared to the comparative-purpose lens member 100 in order of the lens member 30 of the second embodiment, the lens member 90 having diffusion sheets with HAZE values of 29% and 46% serving as the optical sheet 91 in the eighth embodiment, and the lens member 40 of the third embodiment.

Figure 28A:
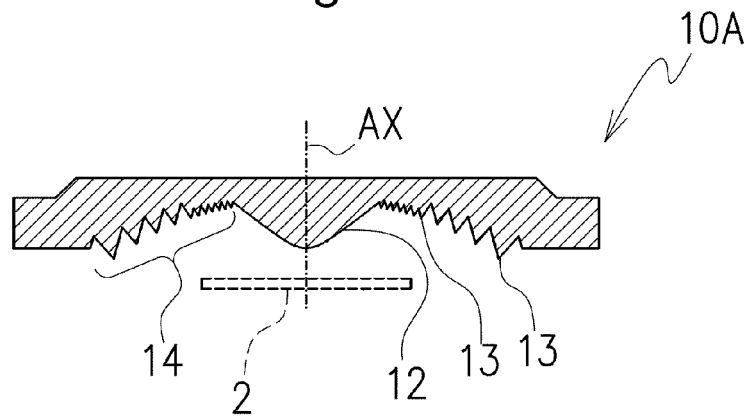
FIG. 28A is a cross-sectional view of a lens member in accordance with a ninth embodiment of the present invention.
Figure 28B:
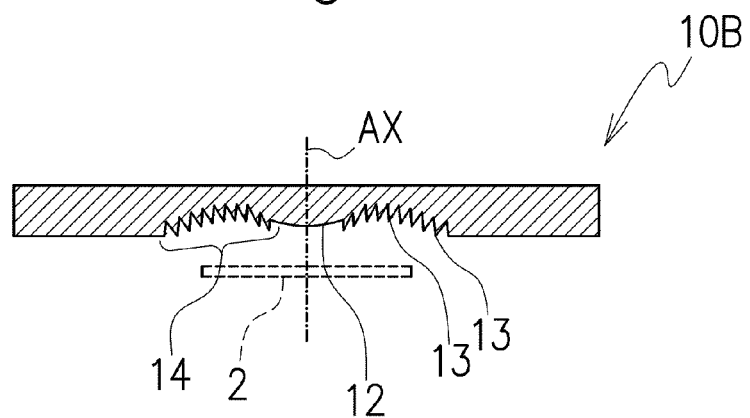
FIG. 28B is a cross-sectional view of a lens member in accordance with a tenth embodiment of the present invention.
Figure 28C:
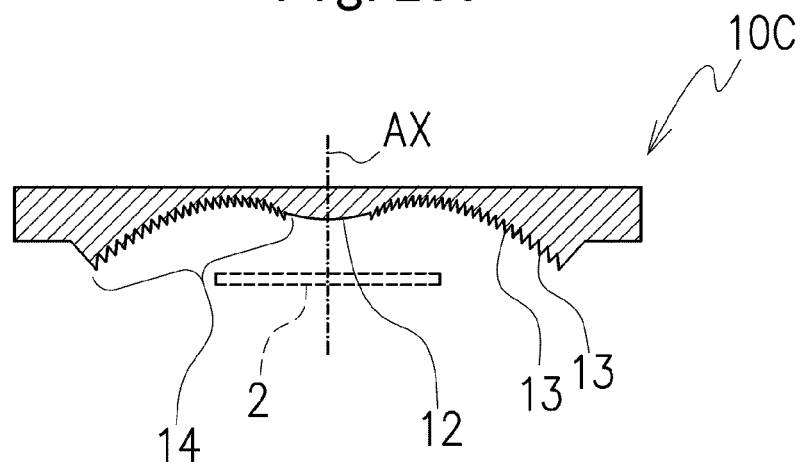
FIG. 28C is a cross-sectional view of a lens member in accordance with an eleventh embodiment of the present invention.

Preferred embodiments of the lens member and optical unit in the present invention have been described, but the present invention is not limited to these embodiments and it should be understood that various modifications and alterations may be made to the embodiments. For example, corresponding to TIR lenses having concave lens portions and convex lens portions with different shapes to those of the conventional TIR lens shown in FIG. 29, lens members 10A, 10B, and 10C as shown in FIGS. 28A, 28B, and 28C may be configured by central convex lens portions 12 with different curves to the above-described first embodiment and by Fresnel lens surfaces 14 with different numbers of divisions to the above-described first embodiment.

What is claimed is:

1. A plate-shaped lens member, configured to have concentric annular prisms each including an inner annular surface divided from a light-entrance surface of a TIR lens and an outer annular surface divided from a light-reflection surface of the TIR lens in which the light-entrance surface has a concave shape provided at a lower portion of the TIR lens and the light-reflection surface has a convex shape positioned outside of the light-entrance surface, the plate-shaped lens member comprising:
   a light source-facing surface having a concave shape and disposed to face a light source; and
   a light-exit surface opposite to the light source-facing surface,
   the concentric annular prisms each including the inner annular surface and the outer annular surface that is positioned outside of the inner annular surface to form each of the prisms, the concentric annular prisms provided on the light source-facing surface, wherein in divided portions of the light-reflection surface of the TIR lens, the divided portions positioned away from a central axis of the TIR lens are allocated to the outer annular surfaces of the concentric annular prisms that are positioned adjacent to a central axis of the plate-shaped lens member,
   the central axis of the plate-shaped lens member corresponding to a central axis of the light source-facing surface, and the light source-facing surface having a Fresnel lens surface fresnel-ized from the TIR lens, the Fresnel lens surface comprising the concentric annular prisms centered on the central axis, and
   each of the concentric annular prisms including the inner annular surface and the outer annular surface, the inner annular surface positioned closer to the central axis than the outer annular surface, and in each of the concentric annular prisms, the outer annular surface being a total-internal-reflection surface that totally internally reflects on the outer annular surface light received through the inner annular surface.

2. The lens member according to claim 1, wherein each of the inner annular surfaces comprises a concave surface and each of the outer annular surface comprises a convex surface.

3. The lens member according to claim 1, wherein each of the outer annular surfaces comprises a planar surface.

4. The lens member according to claim 1, wherein each of the inner annular surface comprising a planar surface and the concentric outer annular surface comprising a planar surface.

5. The lens member according to claim 1, wherein each of the inner annular surface comprising a planar surface and the concentric outer annular surface comprising a quadric surface.

6. The lens member according to claim 1, wherein the light source-facing surface includes a convex lens integrally formed with the light source-facing surface on the central axis of the light source-facing surface and protruding toward the light source.

7. The lens member according to claim 1, wherein each of the inner annular surfaces of the concentric annular prisms faces the light source with an inclined angle to the central axis of the light source-facing surface.

8. The lens member according to claim 1, wherein the concentric annular prisms positioned at a peripheral area of the light source-facing surface are set higher than the concentric annular prisms positioned adjacent to the central axis of the light source-facing surface.

9. The lens member according to claim 1, wherein a plurality of minute irregularities are formed on the light-exit surface opposite to the light source-facing surface, the plurality of minute irregularities being configured to control spread of emitted light.

10. The lens member according to claim 1, wherein the plurality of concentric annular prisms having angles of refraction that differ from each other are formed continuously from a position close to the central axis of the light source-facing surface toward a peripheral area.

11. An optical unit, comprising:
the lens member recited in claim 1; and
a light source including at least one light-emitting diode element,
the optical axis of the light source being disposed coaxially with the central axis of the light source-facing surface.

12. The lens member according to claim 1, wherein the light source-facing surface includes a protruding portion protruding on the central axis of the light source-facing surface in a conic shape.

13. The lens member according to claim 12, wherein an apex of the protruding portion lies on the central axis of the light source-facing surface, and the concentric annular prisms continuously formed from a position close to the apex of the protruding portion toward a peripheral area of the light source-facing surface.

14. The lens member according to claim 12, wherein a plurality of minute irregularities are formed on the light-exit surface.

15. The lens member according to claim 14, wherein each of the minute irregularities has an anisotropic diffusion shape.

16. The lens member according to claim 12, wherein an optical sheet is disposed on the light-exit surface, the optical sheet being configured to control diffusion of light.

17. The lens member according to claim 12, wherein an optical sheet is disposed on the light-exit surface opposite to the light source-facing surface, the optical sheet being configured to control directivity of light.

* * * * *